(12) United States Patent
Ikeda et al.

(10) Patent No.: US 11,815,358 B2
(45) Date of Patent: Nov. 14, 2023

(54) INFORMATION PROCESSING APPARATUS, INFORMATION PROCESSING SYSTEM, INFORMATION PROCESSING METHOD, AND VEHICLE

(71) Applicant: TOYOTA JIDOSHA KABUSHIKI KAISHA, Toyota (JP)

(72) Inventors: Takamasa Ikeda, Nagoya (JP); Toru Sakamoto, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 17/206,596

(22) Filed: Mar. 19, 2021

(65) Prior Publication Data
US 2021/0302186 A1 Sep. 30, 2021

(30) Foreign Application Priority Data
Mar. 27, 2020 (JP) .................................. 2020-058783

(51) Int. Cl.
*G01C 21/34* (2006.01)
*G01C 21/36* (2006.01)

(52) U.S. Cl.
CPC ..... *G01C 21/3484* (2013.01); *G01C 21/3626* (2013.01)

(58) Field of Classification Search
CPC ............ G01C 21/3484; G01C 21/3626; G01C 21/3407; G01C 21/20; G01C 21/343; G01C 21/3492; G01C 21/3647
See application file for complete search history.

(56) References Cited

U.S. PATENT DOCUMENTS

| | | | | |
|---|---|---|---|---|
| 2017/0059345 | A1* | 3/2017 | Sugawara | G01C 21/3492 |
| 2017/0285650 | A1* | 10/2017 | Qian | B60W 30/06 |
| 2018/0004211 | A1* | 1/2018 | Grimm | G06Q 50/28 |
| 2019/0017840 | A1* | 1/2019 | Okamoto | G01C 21/3629 |
| 2019/0265695 | A1* | 8/2019 | Udagawa | G06F 16/29 |

FOREIGN PATENT DOCUMENTS

| | | |
|---|---|---|
| JP | 110-185603 A | 7/1998 |
| JP | 2004170347 A | 6/2004 |
| JP | 2005172740 A * | 6/2005 |

(Continued)

OTHER PUBLICATIONS

JPlatPat English translation of JP-2005-172740-A (Year: 2005).*

(Continued)

*Primary Examiner* — Redhwan K Mawari
(74) *Attorney, Agent, or Firm* — Oliff PLC

(57) ABSTRACT

An information processing apparatus includes a controller. The controller outputs a travel route determined based on a departure point and a destination of a first vehicle in a road network including road nodes and road links. The controller judges whether the first vehicle can traverse a target node, which is a road node among the road nodes included in the travel route, based on dimensional information for the first vehicle, a road width of an entry link entering the target node, and a road width of an exit link exiting from the target node. The controller changes the travel route when it is judged that the first vehicle cannot traverse the target node.

11 Claims, 6 Drawing Sheets

(56) References Cited

FOREIGN PATENT DOCUMENTS

| | | | |
|---|---|---|---|
| JP | 2006177905 A | | 7/2006 |
| JP | 2006184259 A | * | 7/2006 |
| JP | 2007093451 A | * | 4/2007 |
| JP | 2007122395 A | * | 5/2007 |
| JP | 2007-255919 A | | 10/2007 |
| JP | 2007285998 A | * | 11/2007 |
| JP | 2008203160 A | * | 9/2008 |
| JP | 2009115717 A | * | 5/2009 |
| JP | 2009150821 A | * | 7/2009 |
| JP | 2010008268 A | * | 1/2010 |
| JP | 2010054354 A | * | 3/2010 |
| JP | 2010217711 A | | 9/2010 |
| JP | 2010223681 A | * | 10/2010 |
| JP | 2011235847 A | * | 11/2011 |
| JP | 2013011450 A | * | 1/2013 |
| JP | 2015072636 A | | 4/2015 |
| JP | 2015219155 A | * | 12/2015 |
| JP | 2017049044 A | * | 3/2017 |
| JP | 2017138710 A | * | 8/2017 |
| JP | 2017173107 A | * | 9/2017 |
| JP | 2017181391 A | * | 10/2017 |
| JP | 2017181392 A | * | 10/2017 |
| JP | 2018189528 A | | 11/2018 |
| JP | 2019096186 A | * | 6/2019 |
| JP | 2019-148964 A | | 9/2019 |

OTHER PUBLICATIONS

JPlatPat English translation of JP-2007-285998-A (Year: 2007).*
JPlatPat English translation of JP-2010-223681-A (Year: 2010).*
JPlatPat English translation of JP-2011-235847-A (Year: 2011).*
JPlatPat English translation of JP-2015-219155-A (Year: 2015).*
JPlatPat English translation of JP-2017-138710-A (Year: 2017).*
JPlatPat English translation of JP-2017-173107-A (Year: 2017).*

* cited by examiner

INFORMATION PROCESSING APPARATUS, INFORMATION PROCESSING SYSTEM, INFORMATION PROCESSING METHOD, AND VEHICLE

CROSS-REFERENCE TO RELATED APPLICATION

This application claims priority to Japanese Patent Application No. 2020-58783, filed Mar. 27, 2020, the entire contents of which are incorporated herein by reference.

TECHNICAL FIELD

The present disclosure relates to an information processing apparatus, an information processing system, an information processing method, and a vehicle.

BACKGROUND

A route guidance device that enable a driver to select whether to include intersections with left-right turn signals in a route is known. For example, see patent literature (PTL) 1.

CITATION LIST

Patent Literature

PTL 1: JP 2007-255919 A

SUMMARY

The difficulty of turning right or left at an intersection depends on the vehicle. Route guidance not based on vehicle specifications may impair user convenience.

It would be helpful to improve user convenience.

An information processing apparatus according to an embodiment of the present disclosure includes a controller. The controller is configured to output a travel route determined based on a departure point and a destination of a first vehicle in a road network including road nodes and road links. The controller is configured to judge whether the first vehicle can traverse a target node, which is a road node among the road nodes included in the travel route, based on dimensional information for the first vehicle, a road width of an entry link entering the target node, and a road width of an exit link exiting from the target node. The controller is configured to change the travel route when it is judged that the first vehicle cannot traverse the target node.

An information processing system according to an embodiment of the present disclosure includes a server configured to function as the aforementioned information processing apparatus and a terminal apparatus configured to connect communicably to the server.

An information processing method according to an embodiment of the present disclosure includes outputting, by an information processing apparatus, a travel route determined based on a departure point and a destination of a first vehicle in a road network including road nodes and road links. The information processing method includes judging, by the information processing apparatus, whether the first vehicle can traverse a target node, which is a road node among the road nodes included in the travel route, based on dimensional information for the first vehicle, a road width of an entry link entering the target node, and a road width of an exit link exiting from the target node. The information processing method includes changing, by the information processing apparatus, the travel route when it is judged that the first vehicle cannot traverse the target node.

A vehicle according to an embodiment of the present disclosure is a vehicle for riding by a user. The vehicle is configured to travel along a travel route determined based on a departure point and a destination in a road network including road nodes and road links. The travel route is changed when it is judged that the vehicle cannot traverse a target node, which is a road node among the road nodes included in the travel route, based on dimensional information for the vehicle, a road width of an entry link entering the target node, and a road width of an exit link exiting from the target node.

According to the information processing apparatus, the information processing system, the information processing method, and the vehicle of embodiments of the present disclosure, user convenience can be improved.

DETAILED DESCRIPTION (Configuration of Information Processing System 1)

Figure 1:
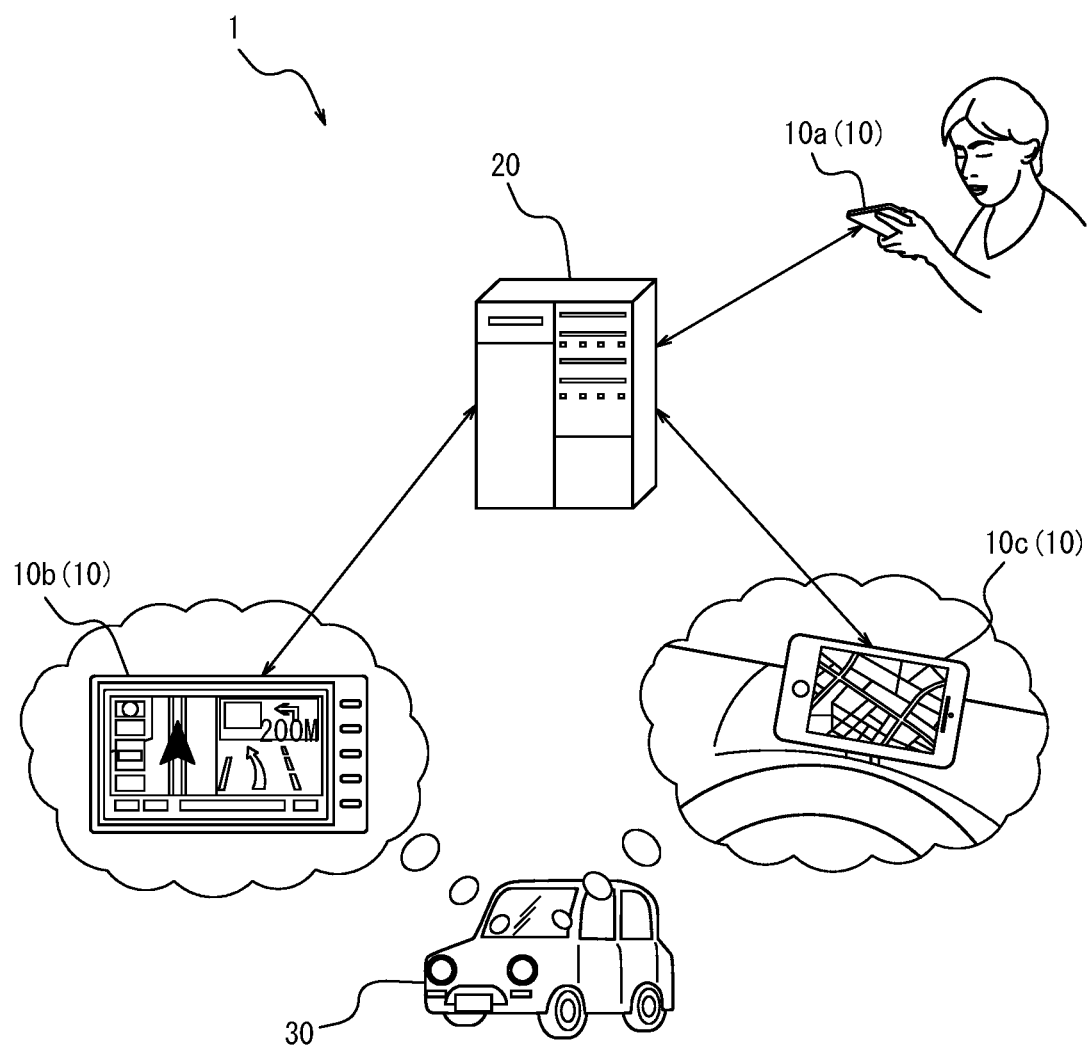
FIG. 1 is a schematic diagram illustrating a configuration example of an information processing system according to an embodiment.
Figure 2:
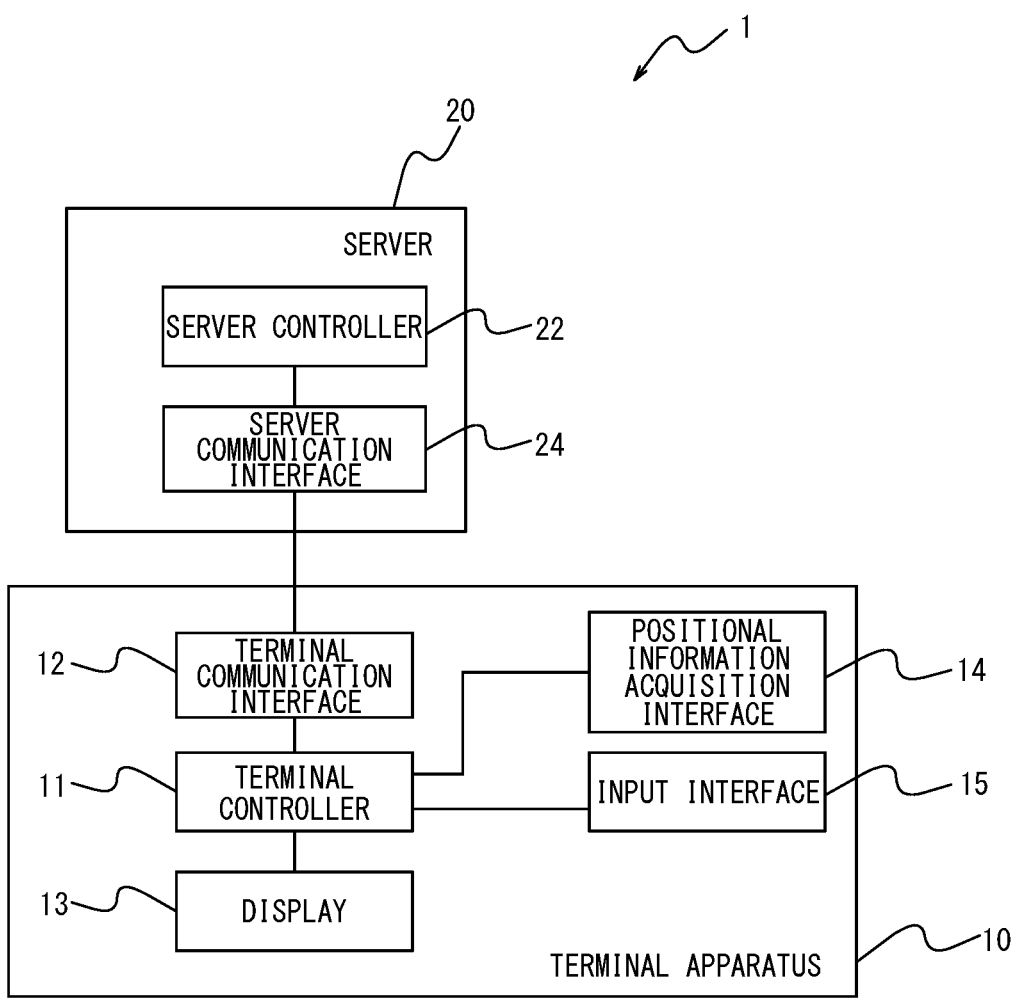
FIG. 2 is a block diagram illustrating a configuration example of an information processing system according to an embodiment.

As illustrated in FIGS. 1 and 2, an information processing system 1 according to an embodiment includes terminal apparatuses 10 and a server 20.

The terminal apparatuses 10 may be portable terminals carried by users. In the example in FIG. 1, the terminal apparatus 10 carried by the user is illustrated as a terminal apparatus 10a.

Figure 3:
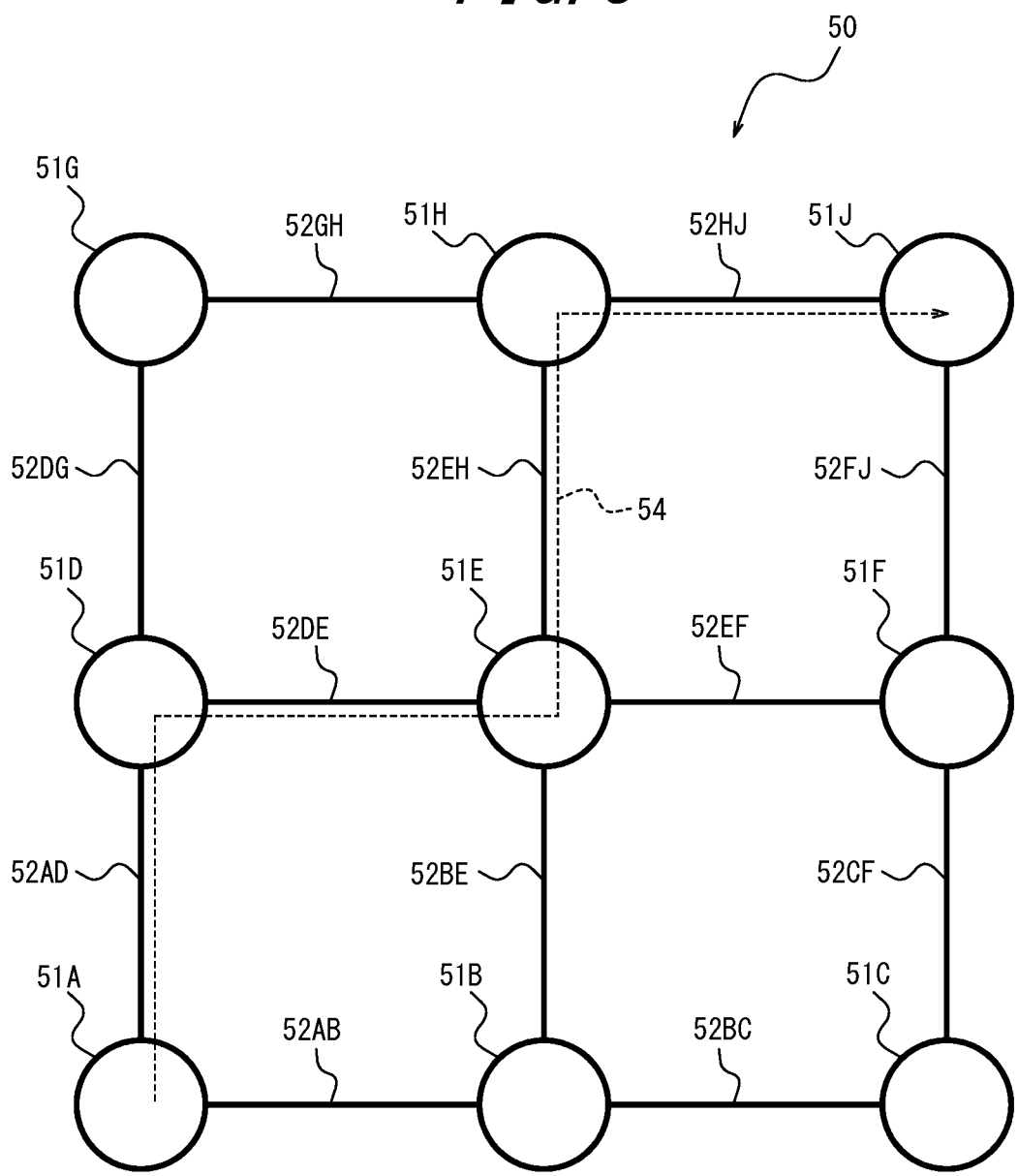
FIG. 3 is a diagram illustrating an example of a road network specified by road nodes and road links.

The information processing system 1 determines a travel route 54 of a vehicle 30 (see FIG. 3). The vehicle 30 may be ridden by a driver and travel by being driven by the driver. The driver may drive the vehicle 30 based on the travel route 54 determined by the information processing system 1. The vehicle 30 may be ridden by a passenger. The driver or passenger of the vehicle 30 is also referred to as the user of the vehicle 30.

The terminal apparatus 10 may be mounted on the vehicle 30. The terminal apparatus 10 may be a car navigation device that provides a navigation function of the vehicle 30. The car navigation system is illustrated in FIG. 1 as a terminal apparatus 10b attached to the vehicle 30. The terminal apparatus 10 may be a mobile terminal, such as a smartphone or tablet, that executes an application providing the navigation function of the vehicle 30. The mobile terminal is illustrated in FIG. 1 as a terminal apparatus 10c. The terminal apparatus 10b as a mobile terminal may be attached to the dashboard, console, or the like of the vehicle 30 or may be carried by a user of the vehicle 30.

The terminal apparatus 10 includes a terminal controller 11, a terminal communication interface 12, a display 13, and an input interface 15.

The terminal controller 11 may include one or more processors. The "processor" is a general-purpose processor, a dedicated processor specialized for specific processing, or the like in the present embodiment but is not limited to these. The terminal controller 11 may include one or more dedicated circuits. The dedicated circuit may include, for example, a field-programmable gate array (FPGA) or an application specific integrated circuit (ASIC). The terminal controller 11 may include a dedicated circuit instead of or in addition to the processor.

The terminal controller 11 may include a memory. The memory is a semiconductor memory, a magnetic memory, an optical memory, or the like, for example, but is not limited to these. The memory may function, for example, as a main memory, an auxiliary memory, or a cache memory. The memory may include an electromagnetic storage medium such as a magnetic disc. The memory may include a non-transitory computer readable medium. The memory stores any information used for operation of the terminal apparatus 10. For example, the memory may store a system program, an application program, or the like. The terminal apparatus 10 may include a memory separate from the terminal controller 11.

The terminal communication interface 12 is connected to an external apparatus, such as a server 20, to communicate with the external apparatus. The terminal communication interface 12 may be connected to an external apparatus, such as the server 20, over a network to communicate with the external apparatus. The terminal communication interface 12 may include a communication module that connects to a network or an external apparatus. The communication module may include, but is not limited to, a communication module compliant with a mobile communication standard such as the 4th Generation (4G) or the 5th Generation (5G) standards.

The display 13 may output visual information such as images, letters, or graphics. The display 13 may be configured to include a display device. The display device may include a light emitting device such as a light emitting diode (LED). The display device may, for example, include a liquid crystal display (LCD), an organic electro-luminescent (EL) display, or an inorganic EL display. The display device may include a plasma display panel (PDP). The display device is not limited to these displays and may include various other types of displays.

The input interface 15 includes an input device for receiving operations or input by a user carrying the terminal apparatus 10. The input device may, for example, include a keyboard or a physical key or may include a touch panel, a touch sensor, or a pointing device such as a mouse. The input device may be configured integrally with the display of the display 13 when the input device is a touch panel or a touch sensor. The input device may, for example, include a microphone or the like that accepts audio input. The input interface 15 is not limited to these examples of input devices and may include a variety of other devices.

The terminal apparatus 10 optionally further includes a positional information acquisition interface 14. The positional information acquisition interface 14 acquires positional information for the terminal apparatus 10. The positional information acquisition interface 14 may include a receiver compatible with a satellite positioning system. The receiver compatible with the satellite positioning system may include, for example, a Global Positioning System (GPS) receiver. In the present embodiment, the terminal apparatus 10 is assumed to be capable of acquiring positional information for the terminal apparatus 10 itself using the positional information acquisition interface 14.

The server 20 includes a server controller 22 and a server communication interface 24. The server controller 22 may include one or more processors or may include one or more dedicated circuits. The server controller 22 may be configured similarly to the terminal controller 11. The server 20 or the server controller 22 may include a memory. The server communication interface 24 is connected to an external apparatus, such as the terminal apparatus 10, to communicate with the external apparatus. The server communication interface 24 may be connected to the external apparatus, such as the terminal apparatus 10, over a network to communicate with the external apparatus. The server communication interface 24 may include a communication module that connects to a network or an external apparatus. The server communication interface 24 may be configured similarly to the terminal communication interface 12. The server 20 may include one or a plurality of server apparatuses capable of communicating with each other.

In the information processing system 1, the terminal apparatus 10 may be configured to determine the travel route 54 of the vehicle 30. Instead, the server 20 may be configured to determine the travel route 54 of the vehicle 30. When the server 20 determines the travel route 54, the terminal apparatus 10 acquires the travel route 54 from the server 20.

In the present embodiment, a road network 50 is represented by road nodes 51 and road links 52, as illustrated in FIG. 3. A letter is appended to the end of the reference sign to distinguish between the road nodes 51, which are represented as road nodes 51A, 51B, 51C, 51D, 51E, 51F, 51G, 51H, 51J. A road link 52 connects each road node 51. Letters are appended to the end of the reference sign to distinguish between the road links 52, which are represented as road links 52AB, 52BC, 52AD, 52BE, 52CF, 52DE, 52EF, 52DG, 52EH, 52FJ, 52GH, 52HJ. The road link 52AB connects the road nodes 51A and 51B. The road link 52BC connects the road nodes 51B and 51C. The road link 52AD connects the road nodes 51A and 51D. The road link 52BE connects the road nodes 51B and 51E. The road link 52CF connects the road nodes 51C and 51F. The road link 52DE connects the road nodes 51D and 51E. The road link 52EF connects the road nodes 51E and 51F. The road link 52DG connects the road nodes 51D and 51G. The road link 52EH connects the road nodes 51E and 51H. The road link 52FJ connects the road nodes 51F and 51J. The road link 52GH connects the road nodes 51G and 51H. The road link 52HJ connects the road nodes 51H and 51J.

The road nodes 51 are located at any points on the map. The road link 52 corresponds to the road connecting two points, that is, the road connecting two road nodes 51. The road node 51 can also be said to be located at the departure point or ending point of the road link 52.

A road node 51 to which three or more road links 52 are connected represents an intersection. For example, road nodes 51B, 51D, 51E, 51F, 51H correspond to intersections to which three or more road links 52 are connected. A road node 51 to which the two road links 52 are connected represents a bend in the middle of a single road. For example, the road nodes 51A, 51C, 51G, 51J correspond to a bend where two road links 52 are connected. The bend may include a point where the two roads intersect clearly, or may include a point where the road is curved with a radius of curvature equal to or less than a predetermined value. In other words, the road link 52 corresponds to a road that does not include a point along the road having a radius of curvature equal to or less than a predetermined value.

(Operations of Information Processing Apparatus)

The terminal apparatus 10 or the server 20 included in the information processing system 1 according to the present embodiment determines and outputs the travel route 54 of the vehicle 30 based on the departure point and the destination of the vehicle 30, which are set in the road network 50 represented by the road nodes 51 and the road links 52. In the example illustrated in FIG. 3, it is assumed that the road node 51A is set as the departure point of the vehicle 30. It is assumed that the road node 51J is set as the destination of the vehicle 30. The determined travel route 54 is illustrated by a dashed line from the road node 51A, through the road nodes 51D, 51E, 51H in this order, to the road node 51J. The travel route 54 may be specified by the road nodes 51 that are traversed. In this case, the travel route 54 is specified as traversing the road nodes 51A, 51D, 51E, 51H, 51J. The travel route 54 may be specified by the road links 52 that are traversed. In this case, the travel route 54 is specified as passing through the road links 52AD, 52DE, 52EH, 52HJ. The terminal apparatus 10 or the server 20 may cause the display 13 of the terminal apparatus 10 to display the travel route 54. The display 13 may display the travel route 54 schematically by a combination of the road nodes 51 and road links 52 of the road network 50. The display 13 may display the travel route 54 in overlay on an actual roadmap.

The terminal apparatus 10 or the server 20 judges whether the vehicle 30 can traverse the travel route 54 specified by road nodes 51 or road links 52. The terminal apparatus 10 or the server 20 changes the travel route 54 when it is judged that the vehicle 30 cannot traverse the travel route 54.

In the information processing system 1, the apparatus for determining and changing the travel route 54 is referred to as an information processing apparatus. The terminal apparatus 10 and the server 20 can both function as the information processing apparatus. Hereinafter, operations that either the terminal apparatus 10 or the server 20 may perform will be described as operations by the information processing apparatus. When the server 20 functions as an information processing apparatus, the server 20 outputs the travel route 54 to the terminal apparatus 10 and causes the terminal apparatus 10 to display the travel route 54 on the display 13. The server controller 22 of the server 20 is also referred to simply as a controller. The terminal apparatus 10 displays the travel route 54 on the display 13 of the terminal apparatus 10 itself when the terminal apparatus 10 functions as the information processing apparatus. The terminal controller 11 of the terminal apparatus 10 is also referred to simply as a controller. When the terminal apparatus 10 is mounted on the vehicle 30 as a car navigation device, the terminal apparatus 10 may, based on the travel route 54, cause information for guiding the driver of the vehicle 30 in driving the vehicle 30 to be displayed on the display 13. When the server 20 functions as the information processing apparatus and outputs information to the terminal apparatus 10 mounted on the vehicle 30, the terminal apparatus 10 is also referred to as an onboard device.

Based on various conditions, the information processing apparatus judges whether the vehicle 30 can traverse the road nodes 51 along the travel route 54. Here, the vehicle 30 may not be able to traverse a road node 51 that requires a right or left turn. For example, the vehicle 30 may be unable to traverse road nodes 51 along the travel route 54 if the vehicle 30 is too large to turn right or left at the road nodes 51. The vehicle 30 may be unable to traverse a road node 51 along the travel route 54 if the road entering the road node 51 or the road exiting the road node 51 is too narrow for a right or left turn at the road node 51. The vehicle 30 may be unable to traverse a road node 51 along the travel route 54 if the angle between the road entering the road node 51 and the road exiting the road node 51 is too small for a right or left turn at the road node 51. The conditions enabling the vehicle 30 to turn right or left at a road node 51 may be determined based on the specifications of the vehicle 30 and the shape of the roads corresponding to the road links 52 leading to the road nodes 51.

The information processing apparatus may judge whether the vehicle can traverse the road nodes 51 included in the travel route 54 assuming that the vehicle 30 travels along the travel route illustrated in FIG. 3. In the travel route 54 illustrated in FIG. 3, the vehicle 30 needs to turn right at road nodes 51D and 51H and turn left at the road node 51E. When the information processing apparatus judges that the vehicle 30 cannot traverse at least one of the road nodes 51 included in the travel route 54, the information processing apparatus judges that the vehicle 30 cannot arrive at the destination along the current travel route 54 and changes the travel route 54. Conversely, if the information processing apparatus judges that the vehicle 30 can traverse all of the road nodes 51 included in the travel route 54, the information processing apparatus can finalize the travel route 54.

Even when the travel route 54 includes an L-shaped road where only two road links 52 connect, such as the road node 51G, the information processing apparatus may judge whether the vehicle 30 can traverse the road node 51G.

The road node 51 that is the target of the judgment as to whether it can be traversed by the vehicle 30 is also referred to as a target node. The road link 52 on which the vehicle 30 enters the target node is also referred to as an entry link. The road link 52 on which the vehicle 30 exits the target node is also referred to as an exit link. The information processing apparatus can judge whether the vehicle 30 can traverse the target node based on the dimensional information for the vehicle 30, the road width of the entry link, and the road width of the exit link. The information processing apparatus may further base the judgment on the shape of the corner of the intersection of the entry link road and the exit link road in plan view with respect to the ground. The shape of the corner of the intersection may include a chamfered shape, a rounded shape, or various other shapes.

The dimensional information for the vehicle 30 includes the full length, full width, diagonal length, wheelbase, and/or minimum turning radius of the vehicle 30. The full length corresponds to the length of the vehicle 30 in the travel direction. The full width corresponds to the length of the vehicle 30 in the direction perpendicular to the travel direction. The diagonal length corresponds to the length of the vehicle 30 from the right front corner to the left rear corner, or from the left front corner to the right rear corner. The wheelbase corresponds to the length from the axle of the front wheels to the axle of the rear wheels. The minimum turning radius corresponds to the radius of the trajectory of the front outer (opposite side from the turning direction) tire of the vehicle 30 when the vehicle 30 is driven while the steering wheel of the vehicle 30 is fully turned. The minimum turning radius is determined based on the maximum turning angle of the front wheels of the vehicle 30 and the wheelbase. The dimensional information for the vehicle 30 may include the inner wheel difference or the outer wheel difference. The inner wheel difference corresponds to the difference between the trajectory of the inner (on the side of the turning direction) front wheel and the trajectory of the inner rear wheel of the vehicle 30 when the vehicle 30 turns. The outer wheel difference corresponds to the difference between the trajectory of the outer (opposite side from the turning direction) front wheel of the vehicle 30 and the trajectory of the outer rear wheel of the vehicle 30 when the vehicle 30 turns.

The vehicle 30 may include a large automobile, such as a bus, truck, or trailer. The vehicle 30 may include a large special automobile such as a crane truck. The vehicle 30 may include a passenger car.

The information processing apparatus may acquire the dimensional information for the vehicle 30 in advance and store the dimensional information in memory. The information processing apparatus may accept input of the dimensional information for the vehicle 30 from the input interface 15 of the terminal apparatus 10.

<Determination of Travel Route 54>

The information processing apparatus judges whether the vehicle 30 can traverse each target node from the entry link to the exit link, taking all of the road nodes 51 included in the travel route 54 as target nodes. When it is judged that the vehicle 30 can traverse all of the road nodes 51 included in the travel route 54, the information processing apparatus finalizes the travel route 54. The information processing apparatus may consider the non-finalized travel route 54 to be a candidate for the travel route 54. A candidate for the travel route 54 is also referred to as a candidate route. When it is judged that the vehicle 30 cannot traverse at least one road node 51 among the road nodes 51 included in the candidate route, the information processing apparatus searches for the travel route 54 again and changes the result to a new candidate route. The information processing apparatus judges whether the vehicle 30 can traverse each target node, taking all of the road nodes 51 included in the changed travel route as target nodes.

While searching again for the travel route 54, the information processing apparatus may set a candidate route that avoids a target node judged not to be traversable by the vehicle 30. The information processing apparatus may set a candidate route that changes the entry link or the exit link at the target node judged not to be traversable by the vehicle 30.

The information processing apparatus may repeat the search for the travel route 54 and the traversability judgment of the target nodes until the travel route 54 can be finalized. The information processing apparatus may change the criteria for the traversability judgment, described below, so that the travel route 54 can be finalized.

When the information processing apparatus causes the travel route 54 to be displayed on the display 13 of the terminal apparatus 10, the travel route 54 may be displayed on the display 13 in a manner enabling the user to distinguish between a retrieved candidate route and the finalized travel route 54. The information processing apparatus may, for example, cause the display color of the candidate route and the display color of the finalized travel route to differ. The information processing apparatus may cause the display 13 to wait to display the travel route 54 until the travel route 54 is finalized.

<Judgment of Traversability of Target Node>

The information processing apparatus can use various methods to judge whether the vehicle 30 can traverse the target node from the entry link to the exit link. An example of a specific judgment method that can be performed by the information processing apparatus is described below.

<<Judgment Based on Trajectory of Vehicle 30>>

The information processing apparatus may judge whether the vehicle 30 can traverse the target node from the entry link to the exit link based on the trajectory when the vehicle 30 travels, the target node through which the vehicle 30 travels, and a comparison between the road shapes of the entry link and the exit link.

Figure 4:
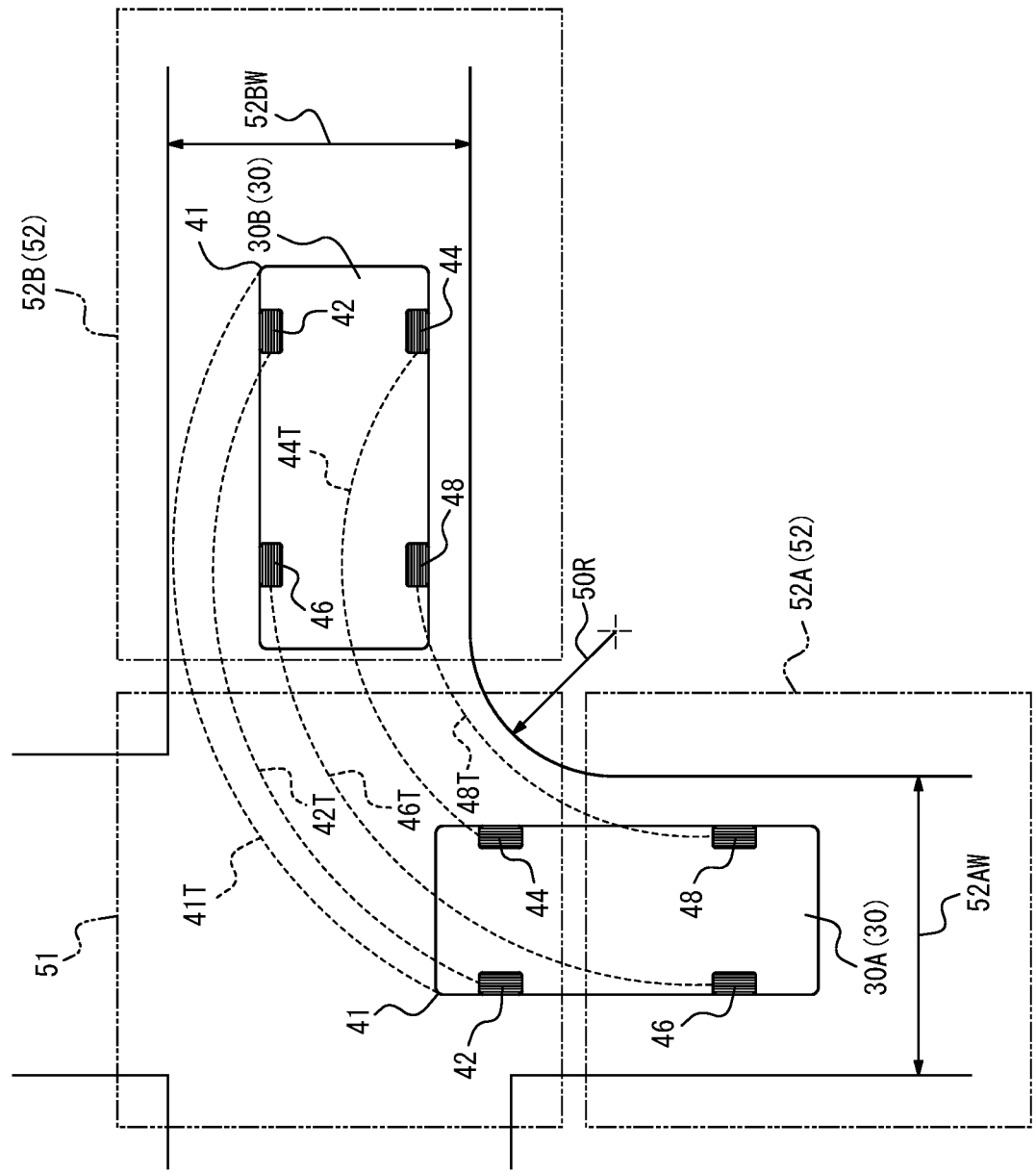
FIG. 4 is a diagram illustrating the relationship between trajectory and a traversable range when a vehicle turns right.

Here, as illustrated in FIG. 4, an intersection where road links 52A and 52B connect to a road node 51 is assumed. The vehicle 30 turns right, from the road link 52A toward the road link 52B, at the intersection corresponding to the road node 51. The vehicle 30 is represented as the vehicle 30A prior to starting the right turn at the intersection. The vehicle 30 is represented as the vehicle 30B after turning right at the intersection and entering the road link 52B.

The trajectory of the vehicle 30 includes the trajectories of the tires of the vehicle 30 and the trajectory of the outer shape of the vehicle 30. The trajectories of the tires of the vehicle 30 are determined based on the tire positions of the vehicle 30. The tire positions of the vehicle 30 are determined based on the wheelbase and the full width of the vehicle 30. The tires of the vehicle 30 include a left front wheel 42, a right front wheel 44, a left rear wheel 46, and a right rear wheel 48. Lines connecting the points that each tire traverses when the vehicle 30 turns right at the intersection become the trajectories of the tires. The trajectory of each tire is illustrated by a dashed line in FIG. 4. The trajectory 42T represents the trajectory of the left front wheel 42. The trajectory 44T represents the trajectory of the right front wheel 44. The trajectory 46T represents the trajectory of the left rear wheel 46. The trajectory 48T represents the trajectory of the right rear wheel 48.

The trajectory of the outer shape of the vehicle 30 represents the range in which the outer shape completely fits when the vehicle 30 travels and is determined based on the outer shape of the vehicle 30. The outer shape of the vehicle 30 is determined based on the full length and full width, or the diagonal length, of the vehicle 30. The vehicle 30 has a left front corner 41 located in front on the left side. A line connecting points traversed by the left front corner 41 when the vehicle 30 turns right at the intersection becomes the trajectory 41T of the left front corner 41, as indicated by a dashed line. In FIG. 4, the trajectory of the outer shape of the vehicle 30 corresponds to the range between the trajectory 41T of the left front corner 41 and the trajectory 48T of the right rear wheel 48.

The information processing apparatus considers the road node 51 of FIG. 4 as the target node, considers the road links 52A and 52B as the entry link and the exit link, and judges whether the vehicle 30 can traverse the target node from the entry link to the exit link. The information processing apparatus may assume the path when the vehicle 30 traverses the target node from the entry link to the exit link and generate the trajectory of the vehicle for the case of the vehicle 30 proceeding along the assumed path.

The information processing apparatus judges that the vehicle 30 can traverse the target node from the entry link to the exit link on the assumed path when the trajectory of the vehicle 30 falls within the range of the entry link and exit link roads. The range of the entry link and exit link roads is also referred to as the traversable range. In FIG. 4, the road widths of the entry link and exit link are represented as 52AW and 52BW, respectively. The edge of the road at the corner where the entry link road and the exit link road intersect has a rounded shape. The radius of the rounded shape is represented as 50R. The traversable range is determined based on the road width of the entry link and the exit link, along with the shape of the edge of the road at the corner where the entry link road and the exit link road intersect.

The information processing apparatus judges that the vehicle 30 cannot traverse the target node from the entry link to the exit link on the assumed path when the trajectory of the vehicle 30 does not fall within the traversable range. The information processing apparatus may change the assumed path of the vehicle 30 and generate the trajectory of the vehicle 30 when the vehicle 30 proceeds along the assumed path after the change. The information processing apparatus may judge that the vehicle 30 cannot traverse the target node from the entry link to the exit link when the trajectory of the vehicle 30 does not fall within the traversable range despite the assumed path of the vehicle 30 having been changed a predetermined number of times or less. The predetermined number of times for limiting the number of times the assumed path is changed may be zero or may be one or more times.

The information processing apparatus may assume a path in which a turning maneuver of the vehicle 30 is performed as the path of the vehicle 30. The information processing apparatus may judge that the vehicle 30 cannot traverse the target node from the entry link to the exit link if the trajectory of the vehicle 30 does not fall within the traversable range even after turning maneuvers of the vehicle 30 are repeatedly performed. The information processing apparatus may judge that the vehicle 30 can traverse the target node from the entry link to the exit link when the trajectory of the vehicle 30 falls within the traversable range after one or more turning maneuvers of the vehicle 30 are performed, provided that the required number of turning maneuvers is less than a predetermined number. Conversely, the information processing apparatus may judge that the vehicle 30 cannot traverse the target node from the entry link to the exit link when the required number of turning maneuvers is equal to or greater than a predetermined number.

The information processing apparatus may further set the traversable range based on information regarding obstacles on the side of the road, such as signs, utility poles, signboards, block walls, or guardrails. In accordance with the height of the obstacle, the information processing apparatus may adopt the trajectories of the tires of the vehicle 30, or the trajectory of the outer shape of the vehicle 30, as the trajectory of the vehicle 30 to be compared with the traversable range. If the height of the obstacle at the side of the road of the target node is lower than the minimum ground clearance of the vehicle 30, the information processing apparatus may judge that the vehicle 30 can traverse the target node from the entry link to the exit link when the trajectories of the tires of the vehicle 30 fall within the traversable range. If the obstacle at the side of the road of the target node is only located at a higher position than the full height of the vehicle 30, the information processing apparatus can ignore the presence of the obstacle. If the height of the obstacle at the side of the road of the target node is lower than the full height of the vehicle 30 and higher than the minimum ground clearance of the vehicle 30, the information processing apparatus may judge that the vehicle can traverse the target node from the entry link to the exit link when the trajectory of the outer shape of the vehicle 30 falls within the traversable range. In this way, the accuracy when judging whether the vehicle 30 can traverse the target node from the entry link to the exit link can be increased.

The information processing apparatus may set the traversable range to a range that is a predetermined margin narrower than either the range determined by the edge of the actual road or the range further limited by an obstacle located at the side of the road. For example, the information processing apparatus may set the range determined by a line that is a predetermined distance inward from the edge of the actual road to be the traversable range. In this way, the clearance between the tires or the outer shape of the vehicle 30 and the road can be increased when the vehicle 30 actually traverses the target node. This expanded clearance reduces the risk of the vehicle 30 not actually being able to traverse the target node, despite the target node having been judged to be traversable. The convenience for the user of the vehicle 30 or the information processing apparatus can therefore be increased.

The predetermined margin set to further narrow the traversable range may be set based on an event that may occur if the vehicle 30 were to exceed the traversable range when traversing the target node. For example, the predetermined margin may be set larger when the traversable range of the target node is determined by the curb of the road than when there is no curb. For example, the predetermined margin may be set larger when the tire runs off the shoulder upon the trajectory of the tire of the vehicle 30 exceeding the traversable range than when the tire does not run off the shoulder. For example, the predetermined margin may be set larger as the hardness of an obstacle that may hit the vehicle 30 when the trajectory of the outer shape of the vehicle 30 exceeds the traversable range is higher. The predetermined margin may also be set larger as the psychological pressure that the obstacle is estimated to place on the driver is greater.

As described above, the information processing apparatus can judge whether the vehicle 30 can traverse the target node from the entry link to the exit link based on the trajectory of the vehicle 30 and the traversable range at the target node.

<<Judgment Based on Transit Record of Another Vehicle>>

The information processing apparatus may judge whether the vehicle can traverse the target node from the entry link to the exit link based on information about another vehicle that has traversed the target node from the entry link to the exit link. To distinguish the vehicle 30 from other vehicles, the vehicle 30 is also referred to as the first vehicle. The other vehicle is also referred to as the second vehicle.

The information processing apparatus may judge whether the vehicle can traverse the target node from the entry link to the exit link based on the dimensional information for the other vehicle that traversed the target node from the entry link to the exit link. For example, the information processing apparatus may judge that the vehicle 30 can traverse the target node from the entry link to the exit link if the total length and total width of the other vehicle that traversed the target node from the entry link to the exit link are greater than the total length and total width of the vehicle 30. The information processing apparatus may judge whether the vehicle 30 can traverse the target node from the entry link to the exit link based on a comparison between other parameters, such as the diagonal length, the wheelbase, or the minimum turning radius. The information processing apparatus may judge whether the vehicle 30 can traverse the target node from the entry link to the exit link by combining a plurality of parameters included in the dimensional information to compare the other vehicle and the vehicle 30.

The dimensional information for the other vehicle that traversed the target node from the entry link to the exit link can be said to be related to the road width of the entry link and the exit link of the target node. Therefore, the judgment based on the dimensional information for the other vehicle and the dimensional information for the vehicle 30 can be said to be a judgment based on the road width of the entry link and the exit link of the target node and the dimensional information for the vehicle 30.

BRIEF SUMMARY

As described above, the information processing apparatus according to the present embodiment can judge whether the vehicle 30 can traverse the target node from the entry link to the exit link based on the dimensional information for the vehicle 30. Furthermore, when the vehicle 30 cannot traverse the target node from the entry link to the exit link, the travel route 54 can be changed. This configuration can provide route guidance in accordance with the specifications of the vehicle 30. The convenience for the user of the vehicle 30 or the information processing apparatus can therefore be increased.

Figure 5:
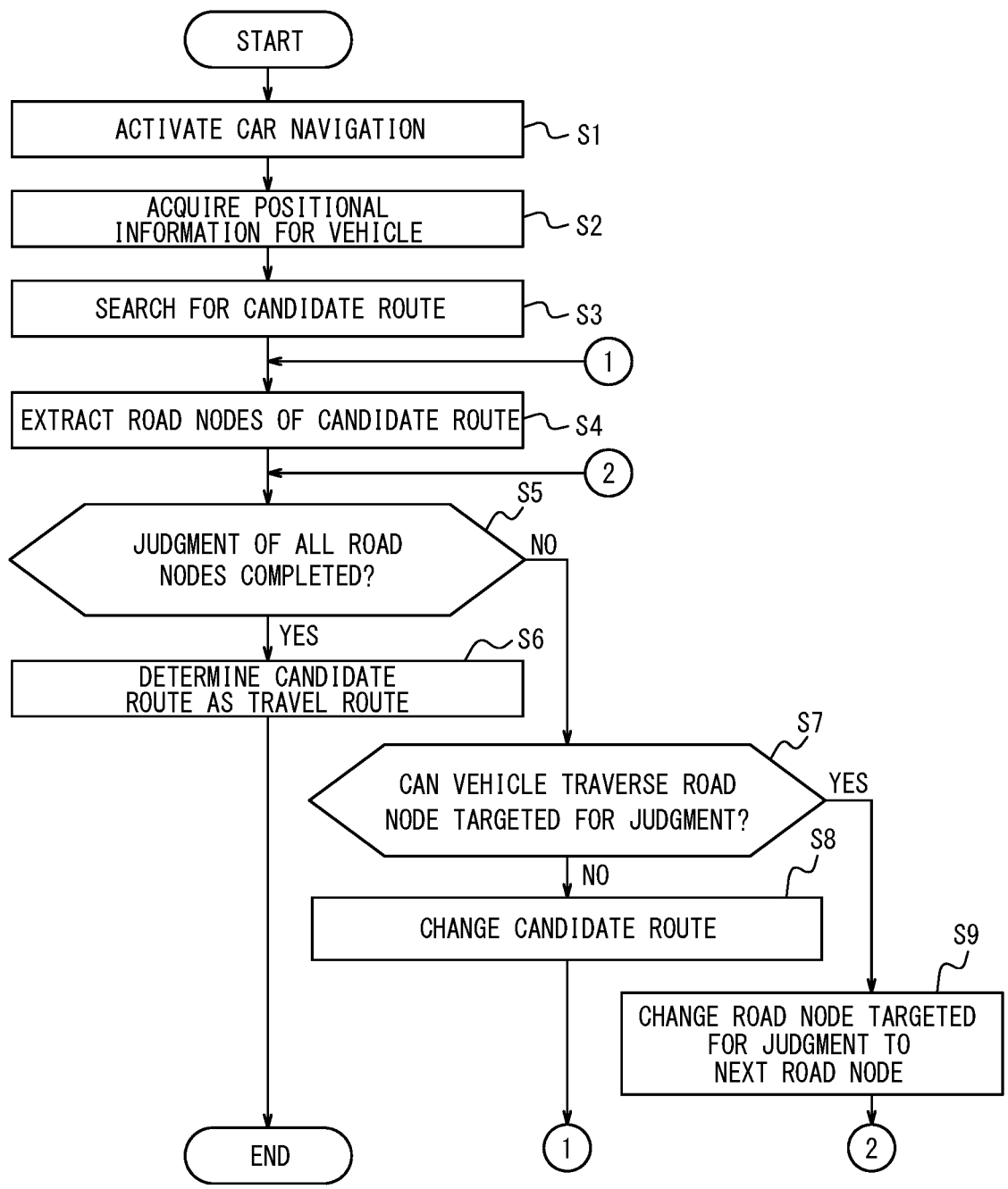
FIG. 5 is a flowchart illustrating an example of an information processing method according to an embodiment.

Example of Information Processing Method Performed by Information Processing Apparatus The information processing apparatus may perform an information processing method including the procedures of the flowchart in FIG. 5, for example. The information processing apparatus can provide route guidance in accordance with the specifications of the vehicle 30 by executing the illustrated information processing method. When the terminal apparatus 10 functions as an information processing apparatus, the information processing method is assumed to be performed by the terminal controller 11. When the server 20 acts as an information processing apparatus, the information processing method is assumed to be performed by the server controller 22. The information processing method may be implemented as an information processing program to be executed by a processor such as the terminal controller 11 or the server controller 22. The information processing program may be stored on a non-transitory computer readable medium.

The information processing apparatus activates a navigation function (step S1). When the navigation function has already been activated, the information processing apparatus can omit step S1.

The information processing apparatus acquires the dimensional information for the vehicle 30 (step S2).

The information processing apparatus searches for a candidate route for the vehicle 30 to travel from the departure point to the destination (step S3). Specifically, the information processing apparatus generates a candidate route from the departure point to the destination based on the information on the road network 50, which includes the road nodes 51 and the road links 52. The information processing apparatus may search the route from the departure point to the destination taking into consideration the distance traveled or the travel time, the traffic conditions of the roads included in the route, the road widths included in the route, or the like. The information processing apparatus may take a point inputted from the input interface 15 of the terminal apparatus 10 as the departure point of the vehicle 30 or may take the current position of the terminal apparatus 10 acquired by the positional information acquisition interface 14 of the terminal apparatus 10 as the departure point of the vehicle 30. The information processing apparatus may take a point inputted from the input interface 15 of the terminal apparatus 10 as the destination of the vehicle 30.

The information processing apparatus extracts the road nodes 51 included in the candidate route (step S4). The information processing apparatus may associate the extracted road nodes 51 with the order in which each road node 51 is reached when the vehicle 30 travels from the departure point along the candidate route to the destination.

For all the road nodes 51 included in the candidate route, the information processing apparatus judges whether the judgment of traversability by the vehicle 30 is complete (step S5). Specifically, the information processing apparatus sets a judgment completion flag for each road node 51 when the judgment is made for the road node 51 in the procedure of step S7, described below. The information processing apparatus may judge that the judgment has been completed for all the road nodes 51 when it is confirmed in step S5 that the judgment completion flag has been set for all of the road nodes 51. Alternatively, the information processing apparatus may set the judgment completion flag when the road node 51 to be judged is changed to the next road node 51 in step S9, described below, based on the order assigned in step S4, and the road node 51 after the change is the destination. The information processing apparatus may judge that the judgment is complete for all of the road nodes 51 when confirming, in step S5, that the judgment completion flag has been set for the road node 51 of the destination.

When the information processing apparatus completes the judgment of traversability by the vehicle 30 for all the road nodes 51 included in the candidate route (step S5: YES), the information processing apparatus determines the candidate route as the travel route 54 (step S6). The information processing apparatus may end the performance of the procedures in the flowchart of FIG. 5 after the performance of the procedure in step S6.

When the information processing apparatus has not completed the judgment of traversability by the vehicle 30 for all the road nodes 51 included in the candidate route (step S5: NO), the information processing apparatus judges whether the vehicle 30 can traverse the target node, which is the road node 51 to be judged (step S7). In other words, if the information processing apparatus has not completed the judgment for at least one road node 51 among the road nodes 51 included in the candidate route, the information processing apparatus performs the procedure of step S7. When performing the procedure of step S7 before performing the procedure of step S9, described below, the information processing apparatus may perform the judgment procedure of step S7 with the next road node 51 from the departure point as the first road node 51 to be judged. As described above, the information processing apparatus may judge whether the vehicle 30 can traverse the target node from the entry link to the exit link based on the trajectory of the vehicle 30. The information processing apparatus may judge whether the vehicle 30 can traverse the target node from the entry link to the exit link based on information about another vehicle that has traversed the target node from the entry link to the exit link.

When the vehicle 30 cannot traverse the target node from the entry link to the exit link (step S7: NO), the information processing apparatus searches for a candidate route again and changes the candidate route (step S8). When changing the candidate route, the information processing apparatus may search for a route in which the entry link or the exit link is changed at the target node that the vehicle 30 could not traverse and may designate the route as the candidate route. The information processing apparatus may search for a route that does not traverse the target node that the vehicle 30 could not traverse and may designate the route as the candidate route. After performing the procedure of step S8, the information processing apparatus proceeds to the procedure of step S4.

When the vehicle 30 can traverse the target node from the entry link to the exit link (step S7: YES), the information processing apparatus changes the road node 51 to be judged to the next road node 51 (step S9). The information processing apparatus changes the road node 51 based on the order associated with the road nodes 51 by the procedure of step S4. After performing the procedure of step S9, the information processing apparatus proceeds to the procedure of step S5.

The procedures of the flowchart in FIG. 5 are only examples. The information processing apparatus may perform the steps after appropriately changing the order of the steps and/or omitting at least one step. The information processing apparatus may judge the road nodes 51 in order from the destination back to the departure point. Specifically, the information processing apparatus may set the road node 51 that is one before the destination to be the first judgment target in the procedure of step S7, and the information processing apparatus may change the road node 51 that connects in the direction back towards the departure point to the next road node 51.

According to the information processing method or the information processing program of the present embodiment, it can be judged whether the vehicle 30 can traverse the target node from the entry link to the exit link based on dimensional information for the vehicle 30, as described above. Furthermore, the travel route 54 can be changed when the vehicle 30 is unable to traverse the target node from the entry link to the exit link. This configuration can provide route guidance in accordance with the specifications of the vehicle 30. The convenience for the user of the vehicle or the information processing apparatus can therefore be increased.

Other Embodiments

The information processing apparatus may use various other criteria in addition to the above-described examples to judge whether the vehicle 30 can traverse the target node from the entry link to the exit link.

<Judgment Based on Driver's Skill Level>

The information processing apparatus may judge whether the vehicle 30 can traverse the target node from the entry link to the exit link when a certain driver drives the vehicle 30. The driver of the vehicle 30 that is the target of the judgment as to whether the target node can be traversed from the entry link to the exit link is also referred to as a judgment target driver. The information processing apparatus may determine whether the vehicle 30 driven by the judgment target driver can traverse the target node from the entry link to the exit link based on information related to the driving skill of the judgment target driver. The information related to the driving skill of the judgment target driver is also referred to as driving skill information. The driving skill information represents the level of the driving skill of the judgment target driver.

<<Acquisition of Driving Skill Information Based on Travel Record of Judgment Target Driver>>

The information processing apparatus may acquire the driving skill information for the judgment target driver based on driving data for when the judgment target driver traversed various road nodes 51 by driving the vehicle or another vehicle. The vehicle 30 or the other vehicle driven by the judgment target driver is also referred to as the judgment target vehicle. As the driving data for when the judgment target vehicle traversed the road node 51, the information processing apparatus may acquire the time spent traversing the road node 51, or the number of turning maneuvers performed. As the driving data for when the judgment target vehicle traversed the road node 51, the information processing apparatus may acquire data that specifies the movement of the judgment target vehicle, such as acceleration data or speed data of the judgment target vehicle as the driving data. The information processing apparatus may, for example, set an ideal route for each road node 51, generate driving skill information representing a higher level of driving skill of the judgment target driver as the difference between the route actually traversed by the judgment target vehicle and the ideal route is smaller, and acquire the generated driving skill information.

<<Acquisition of Driving Skill Information Based on Comparison with Driving Data of Another Driver>>

The driving skill information can be acquired based on driving data of a road node 51 where differences in drivers' skills at the time of traversal are highly apparent. The road node 51 where differences in drivers' skills at the time of traversal are highly apparent is also referred to as a skill judgment node. The skill judgment node may, for example, include a road node 51 where the time spent for traversal can vary greatly in accordance with the difference in skill of the driver. The skill judgment node may, for example, include a road node 51 where the number of turning maneuvers required for traversal can vary greatly in accordance with the difference in skill of the driver. For example, the skill judgment node may include a road node 51 where the entry link road and the exit link road intersect at a sharp angle. The skill judgment node may, for example, include a road node 51 where the road width of the entry link or the exit link is close to the full width of the vehicle 30.

The information processing apparatus may acquire the driving skill information for the judgment target driver based on driving data when the judgment target vehicle traverses the skill judgment node. The information processing apparatus may perform statistical processing of data associating the travel data of various vehicles driven by various drivers as they traverse the skill judgment node with the dimensional information for the vehicle. The various vehicles operated by various drivers are also referred to as sample vehicles. Based on the result of statistical processing of the data associating the travel data of the sample vehicles with the dimensional information, the information processing apparatus can acquire standard travel data as though various drivers were driving the same vehicle as the judgment target vehicle and traversed the skill judgment node. The standard driving data may, for example, include a statistic such as the average value or standard deviation of the time that the same vehicle as the judgment target vehicle spends to traverse the skill judgment node. The time spent to traverse the skill judgment node is also referred to as the traversal time. The standard travel data may, for example, include a statistic such as the average value or standard deviation of the number of turning maneuvers performed by the same vehicle as the judgment target vehicle to traverse the skill judgment node. The number of turning maneuvers performed to traverse the skill judgment node is also referred to as the number of turning maneuvers.

The information processing apparatus may calculate the difference between the traversal time when the judgment target vehicle traverses the skill judgment node and the average value of the traversal time, included in the standard travel data, as the driving skill information for the judgment target driver. The information processing apparatus may calculate the deviation value of the traversal time when the judgment target vehicle traverses the skill judgment node based on the average value and standard deviation of the traversal time included in the standard travel data. The information processing apparatus may then consider the deviation value as the driving skill information for the judgment target driver.

The information processing apparatus may calculate the difference between the number of turning maneuvers performed when the judgment target vehicle traverses the skill judgment node and the average value of the number of turning maneuvers, included in the standard travel data, as the driving skill information for the judgment target driver. The information processing apparatus may calculate the deviation value of the number of turning maneuvers performed when the judgment target vehicle traverses the skill judgment node based on the average value and standard deviation of the number of turning maneuvers included in the standard travel data. The information processing apparatus may then consider the deviation value as the driving skill information for the judgment target driver.

The information processing apparatus is not limited to these examples and may acquire the driving skill information for the judgment target driver based on various travel data acquired when the judgment target vehicle traverses the skill judgment node. The driving skill information for the judgment target driver may be updated based on the new travel data.

<<Judgment Method Based on Driving Skill Information>>

As described above, the information processing apparatus may calculate the driving skill information for the judgment target driver as a numerical value. The information processing apparatus may calculate the numerical value of the driving skill information to be higher as the driving skill of the judgment target driver is higher. In the case of the numerical value of the driving skill information being higher as the driving skill of the judgment target driver is higher, the information processing apparatus may judge that the judgment target driver can drive the vehicle 30 to traverse the target node from the entry link to the exit link when the numerical value of the driving skill information for the judgment target driver is equal to or higher than a skill threshold.

The information processing apparatus may set the skill threshold based on the difference between the dimensional information for the judgment target vehicle and the dimensional information for the vehicle 30. For example, when the outer shape of the vehicle 30 is smaller than the outer shape of the judgment target vehicle, the information processing apparatus may set a low skill threshold. The information processing apparatus may set a skill threshold for each target node. The information processing apparatus may set the skill threshold of the target node based on the difference, between the target node and the skill judgment node, in the road width of the entry link and the exit link or the intersection angle of the entry link and the exit link.

The information processing apparatus may set a larger predetermined margin to further narrow the traversable range as the driving skill of the judgment target driver is lower.

Brief Summary

As described above, based on the driving skill information, the information processing apparatus can judge whether the vehicle 30 can traverse the target node from the entry link to the exit link when the judgment target driver drives the vehicle 30. Basing judgment in this way on information on the driver, such as the driving skill information, can improve the accuracy of route guidance. The convenience for the user of the vehicle or the information processing apparatus can therefore be increased.

<Judgment Based on Traversal Difficulty of Target Node>

The information processing apparatus may judge whether the vehicle can traverse the target node from the entry link to the exit link based on the traversal difficulty of the target node. The traversal difficulty of the target node is expressed as a numerical value. The higher the probability that the vehicle 30 is judged to be incapable of traversing the target node, the larger the value is set.

The traversal difficulty of the target node may be set based on the dimensional information for the vehicle 30 and the information for the entry link and the exit link leading to the target node. For example, as the outer shape of the vehicle 30 is larger, the traversal difficulty of the target node may be set to a larger value. For example, as the road width of the entry link or exit link is narrower, the traversal difficulty of the target node may be set to a larger value.

The traversal difficulty of the target node may be set based on the trajectory of the vehicle 30 that is assumed when the vehicle 30 traverses the target node. For example, as the clearance between the trajectory of the outer shape of the vehicle 30 assumed when the vehicle 30 traverses the target node and an obstacle located on the periphery of the road of the target node is smaller, the traversal difficulty of the target node may be set to a larger value. For example, as the clearance between the trajectory of the tires of the vehicle 30 assumed when the vehicle 30 traverses the target node and the edge of the road of the target node is smaller, the traversal difficulty of the target node may be set to a larger value.

The information processing apparatus may set the traversal difficulty of the target node based on the operations of the vehicle 30 required when the vehicle 30 traverses the target node. For example, the information processing apparatus may set the traversal difficulty of the target node to a large value when a turning maneuver needs to be performed for the vehicle 30 to traverse the target node. The information processing apparatus may, for example, set the traversal difficulty of the target node to a larger value as the number of times the steering wheel is turned for the vehicle 30 to traverse the target node is greater.

The information processing apparatus may assume a path for the vehicle 30 such that the trajectory of the vehicle 30 falls within the traversable range of the target node and generate information specifying operations that the driver needs to perform to drive the vehicle 30 on the assumed path. The operations performed by the driver include, for example, steering, accelerating, or braking operations. The information processing apparatus may set the traversal difficulty of the target node based on the content of operations that the driver needs to perform for the vehicle 30 to traverse the target node from the entry link to the exit link.

The information processing apparatus may judge that the vehicle 30 cannot traverse the target node from the entry link to the exit link when the traversal difficulty of the target node is equal to or greater than a predetermined degree of difficulty. The predetermined degree of difficulty may be set based on input from the user. The predetermined degree of difficulty may, for example, be set based on the driving skill information for the driver of the vehicle 30.

The information processing apparatus may set the traversal difficulty in advance for each road node 51 of the road network 50. The information processing apparatus may set the traversal difficulty of each road node 51 for each combination of an entry link and an exit link. In this manner, the information processing apparatus can conveniently judge whether the vehicle can traverse the target node from the entry link to the exit link. By simplifying the judgment, the time spent in determining the travel route 54 can be reduced. The convenience for the user of the vehicle 30 or the information processing apparatus can therefore be increased.

The information processing apparatus may express the traversal difficulty as a numerical value. The information processing apparatus may express the traversal difficulty as predetermined levels. The predetermined levels may, for example, be classified as easy, somewhat difficult, difficult, or impossible. These classifications may be indicated by symbols, such as a round symbol representing that traversal is easy, a triangle representing that traversal is somewhat difficult, or an X representing that traversal is difficult or impossible.

When searching for the travel route 54 from a certain departure point to the destination, the information processing apparatus may store the traversal difficulty of the road nodes 51 included in the retrieved travel route 54 in association with the data of the road network 50. When the information processing apparatus searches for another travel route 54, and a road node 51 that was previously retrieved is included in the retrieved travel route 54, the information processing apparatus may judge whether traversal is possible by using the traversal difficulty already associated with the road node 51. In other words, the number of road nodes 51 with a pre-set traversal difficulty increases. In this way, the time spent in determining the travel route 54 can be reduced. The convenience for the user of the vehicle 30 or the information processing apparatus can therefore be increased.

Examples of Other Forms of Vehicle 30

Figure 6:
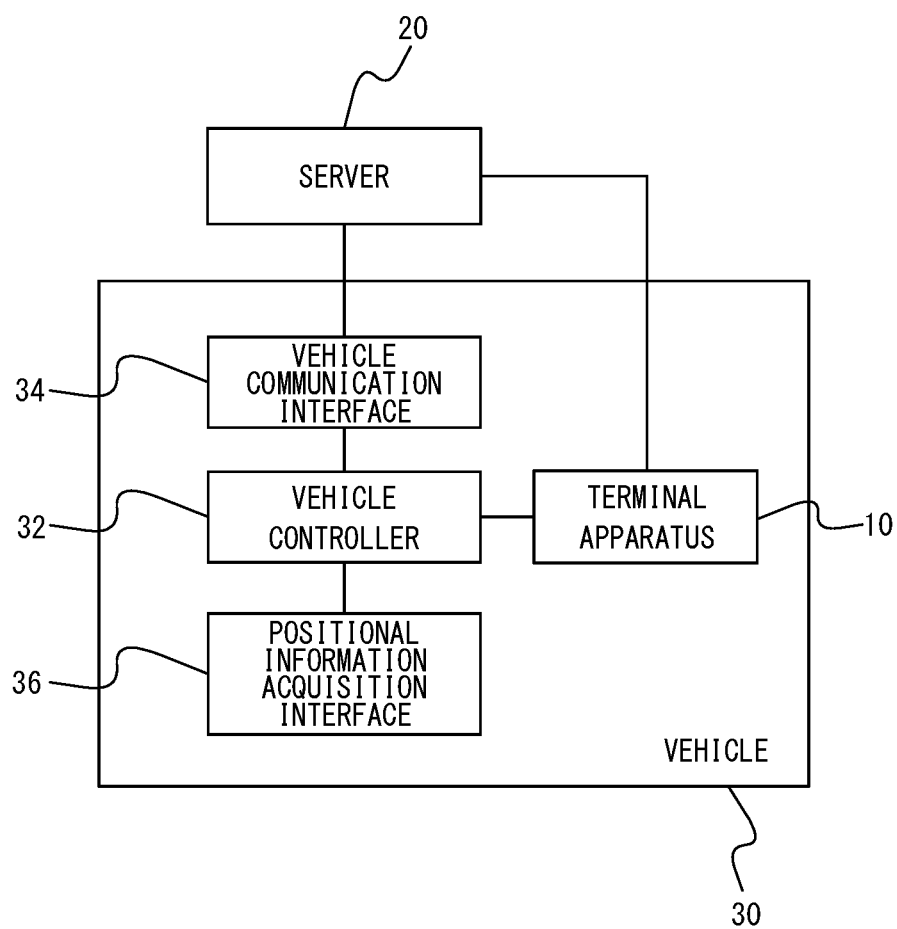
FIG. 6 is a block diagram illustrating an example in which the vehicle is configured to be capable of autonomous driving.

As illustrated in FIG. 6, the information processing system 1 according to an embodiment includes a vehicle 30 and a server 20. The vehicle 30 includes a vehicle controller 32, a vehicle communication interface 34, and a positional information acquisition interface 36. The vehicle controller 32, the vehicle communication interface 34, and the positional information acquisition interface 36 are, for example, communicably connected to each other via an in-vehicle network or a dedicated line such as a Controller Area Network (CAN).

The vehicle controller 32 controls the components included in the vehicle 30. The vehicle controller 32 may include one or more processors, may include one or more dedicated circuits instead of a processor, or may include one or more dedicated circuits along with a processor. The vehicle controller 32 may be configured similarly to the terminal controller 11. The vehicle 30 or the vehicle controller 32 may include a memory.

The vehicle communication interface 34 is communicably connected to the server 20. The vehicle communication interface 34 may, for example, be a vehicle-mounted communication device. The vehicle communication interface 34 may include a communication module that communicably connects to the network or server 20. The vehicle communication interface 34 may be configured similarly to the terminal communication interface 12.

The positional information acquisition interface 36 acquires positional information for the vehicle 30. The positional information acquisition interface 36 may be configured similarly to the positional information acquisition interface 14 of the terminal apparatus 10.

The vehicle 30 may be configured to be driven by a driver. The vehicle 30 may be configured to be driven autonomously. The autonomous driving may, for example, be performed according to any level from Level 1 to Level 5 as defined by the Society of Automotive Engineers (SAE). Without being limited to the exemplified definition, the autonomous driving may be performed based on other definitions.

While not essential, the vehicle 30 may further include a terminal apparatus 10. The terminal apparatus 10 is communicably connected to the vehicle controller 32 via an in-vehicle network or dedicated line. The terminal apparatus 10 may be communicably connected to the server 20 via an external wireless network. The terminal apparatus 10 may be configured as a car navigation device mounted on the vehicle 30. The terminal apparatus 10 may be included in the information processing system 1 as a mobile terminal carried by the user of the vehicle 30.

When the vehicle 30 is controlled by autonomous driving, the vehicle controller 32 controls travel of the vehicle 30 based on the positional information for the vehicle 30 acquired by the positional information acquisition interface 36. The terminal apparatus 10 or the server 20 outputs control information including information specifying the destination of the vehicle 30 to the vehicle controller 32. The vehicle controller 32 controls travel of the vehicle 30 based further on the control information outputted by the terminal apparatus 10 or the server 20 and causes the vehicle 30 to move to the destination.

The terminal apparatus 10 or the server 20 determines the travel route 54 of the vehicle 30 by performing the operations of information processing apparatus described above and outputs the travel route 54 to the vehicle controller 32. The vehicle controller 32 controls the travel of the vehicle 30 based on the determined travel route 54 and the positional information for the vehicle 30 acquired by the positional information acquisition interface 36 and causes the vehicle 30 to travel to the destination.

As described above, the information processing system 1 according to the present embodiment can cause the autonomously driven vehicle 30 to travel from the departure point to the destination. In this manner, the autonomously driven vehicle 30 is less likely to unexpectedly enter a road node 51 that is difficult or impossible to traverse, and the vehicle 30 can travel smoothly to the destination. The convenience for the user of the vehicle 30 or the information processing apparatus can therefore be increased.

The autonomously driven vehicle 30 can traverse a road node 51 that can only be traversed by complex driving operations, such as turning maneuvers, in a highly reproducible manner, regardless of the driver's skill. The information processing system 1 may reduce the clearance set between the vehicle 30 and an obstacle located on the periphery of the road when judging whether the autonomously driven vehicle 30 can traverse the target node. Conversely, the information processing system 1 may increase the clearance set between the vehicle 30 and an obstacle located on the periphery of the road to reduce the likelihood of the autonomously driven vehicle 30 becoming incapable of travel due to unexpected conditions.

While an embodiment of the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined together or divided.

The invention claimed is:

1. An information processing apparatus comprising:
a memory storing:
vehicle dimensional information; and
road width information;
a controller programmed to, prior to a first vehicle traveling a finalized travel route:
output a travel route determined based on a departure point and a destination of the first vehicle in a road network including road nodes and road links;
access stored dimensional information for the first vehicle, a stored road width of an entry link entering a target node, and a stored road width of an exit link exiting from the target node, the stored dimensional information for the first vehicle including an inner wheel difference or an outer wheel difference;
determine whether the first vehicle can traverse the target node, which is a road node among the road nodes included in the travel route, before the first vehicle will arrive at the target node based on dimensional information for the first vehicle, a road width of an entry link entering the target node, and a road width of an exit link exiting from the target node;
determine, based on driving skill information representing a level of driving skill of a driver, whether the first vehicle can traverse the target node when the driver drives the first vehicle by:
generating the driving skill information based on travel data for the driver traversing the target node, or a different road node from the target node, in the first vehicle; and
determining that the first vehicle driven by the driver cannot traverse the target node when a traversal difficulty representing a degree of difficulty when the first vehicle traverses the target node is equal to or greater than a predetermined degree of difficulty determined based on the driving skill information;
change the travel route to exclude the target node when it is determined that the first vehicle cannot traverse the target node;
generate the finalized travel route by finalizing the travel route when it is determined that the first vehicle can traverse every node of the travel route; and
output the finalized travel route to the first vehicle.

2. The information processing apparatus of claim 1, wherein the controller is programmed to determine whether the first vehicle can traverse the target node based further on an angle between a road of the entry link and a road of the exit link at the target node.

3. The information processing apparatus of claim 1, wherein the controller is programmed to:
set the traversal difficulty based on:
a number of turning maneuvers required when the first vehicle traverses the target node;
a clearance of a trajectory of an outer shape of the first vehicle, or a trajectory traversed by a tire of the first vehicle, relative to an obstacle in a periphery of the target node; and
travel data for a second vehicle, different from the first vehicle, traversing the target node.

4. The information processing apparatus of claim 1, wherein the dimensional information for the first vehicle includes a full length, a full width, a diagonal length, a wheelbase, or a minimum turning radius of the first vehicle.

5. An information processing system comprising:
a server configured to function as the information processing apparatus of claim 1; and
a terminal apparatus configured to connect communicably to the server.

6. An information processing method comprising:
prior to a first vehicle traveling a finalized travel route:
outputting, by an information processing apparatus, a travel route determined based on a departure point and a destination of the first vehicle in a road network including road nodes and road links;
accessing stored dimensional information for the first vehicle, a stored road width of an entry link entering a target node, and a stored road width of an exit link exiting from the target node, the stored dimensional information for the first vehicle including an inner wheel difference or an outer wheel difference;
determining, by the information processing apparatus, whether the first vehicle can traverse the target node, which is a road node among the road nodes included in the travel route, before the first vehicle will arrive at the target node based on dimensional information for the first vehicle, a road width of an entry link entering the target node, and a road width of an exit link exiting from the target node;
determining, based on driving skill information representing a level of driving skill of a driver, whether the first vehicle can traverse the target node when the driver drives the first vehicle by:
generating the driving skill information based on travel data for the driver traversing the target node, or a different road node from the target node, in the first vehicle; and
determining that the first vehicle driven by the driver cannot traverse the target node when a traversal difficulty representing a degree of difficulty when the first vehicle traverses the target node is equal to or greater than a predetermined degree of difficulty determined based on the driving skill information;
changing, by the information processing apparatus, the travel route to exclude the target node when it is determined that the first vehicle cannot traverse the target node;
generating, by the information processing apparatus, the finalized travel route by finalizing the travel route when it is determined that the first vehicle can traverse every node of the travel route; and
outputting the changed finalized travel route to the first vehicle.

7. The information processing method of claim 6, further comprising determining, by the information processing apparatus, whether the first vehicle can traverse the target node based further on an angle between a road of the entry link and a road of the exit link at the target node.

8. The information processing method of claim 6, further comprising:
setting the traversal difficulty based on:
a number of turning maneuvers required when the first vehicle traverses the target node;

a clearance of a trajectory of an outer shape of the first vehicle, or a trajectory traversed by a tire of the first vehicle, relative to an obstacle in a periphery of the target node; and travel data for a second vehicle, different from the first vehicle, traversing the target node.

9. A vehicle comprising:
an information processing apparatus comprising:
   a memory storing:
      vehicle dimensional information; and
      road width information;
   a controller programmed to, prior to the vehicle traveling a finalized route:
      output a travel route determined based on a departure point and a destination of the vehicle in a road network including road nodes and road links;
      access stored dimensional information for the vehicle, a stored road width of an entry link entering a target node, and a stored road width of an exit link exiting from the target node, the stored dimensional information for the vehicle including an inner wheel difference or an outer wheel difference;
      determine whether the vehicle can traverse the target node, which is a road node among the road nodes included in the travel route, before the vehicle will arrive at the target node based on dimensional information for the vehicle, a road width of an entry link entering the target node, and a road width of an exit link exiting from the target node;
      determine, based on driving skill information representing a level of driving skill of a driver, whether the vehicle can traverse the target node when the driver drives the vehicle by:
         generating the driving skill information based on travel data for the driver traversing the target node, or a different road node from the target node, in the vehicle; and
         determining that the vehicle driven by the driver cannot traverse the target node when a traversal difficulty representing a degree of difficulty when the vehicle traverses the target node is equal to or greater than a predetermined degree of difficulty determined based on the driving skill information;
      change the travel route to exclude the target node when it is determined that the vehicle cannot traverse the target node;
      generate the finalized travel route by finalizing the travel route when it is determined that the vehicle can traverse every node of the travel route; and
      output the finalized travel route to the vehicle.

10. The information processing apparatus of claim 3, wherein the controller is programmed to:
   determine if the obstacle is located higher than a full height of the first vehicle or lower than a minimum ground clearance of the first vehicle; and
   ignore the obstacle when the obstacle is located higher than the full height of the first vehicle or lower than the minimum ground clearance of the first vehicle.

11. The information processing apparatus of claim 1, wherein the controller is programmed to determine whether the first vehicle can traverse a target node based on a predetermined clearance margin representing a distance to be maintained between the vehicle and any obstacle, the predetermined margin being set based on an existence of a curb of the road on the entry link.

* * * * *